(12) United States Patent
Fuji

(10) Patent No.: US 11,939,163 B2
(45) Date of Patent: Mar. 26, 2024

(54) ARTICLE ACCOMMODATION FACILITY

(71) Applicant: Daifuku Co., Ltd., Osaka (JP)

(72) Inventor: Toshitaka Fuji, Hinocho (JP)

(73) Assignee: Daifuku Co., Ltd., Osaka (JP)

(\*) Notice: Subject to any disclaimer, the term of this patent is extended or adjusted under 35 U.S.C. 154(b) by 366 days.

(21) Appl. No.: 17/213,949

(22) Filed: Mar. 26, 2021

(65) Prior Publication Data

US 2021/0300681 A1   Sep. 30, 2021

(30) Foreign Application Priority Data

Mar. 27, 2020 (JP) ................... 2020-058653

(51) Int. Cl.
*B65G 1/137* (2006.01)

(52) U.S. Cl.
CPC ................... *B65G 1/1375* (2013.01)

(58) Field of Classification Search
CPC .................................................. B65G 1/1375
See application file for complete search history.

(56) References Cited

U.S. PATENT DOCUMENTS

| | | | |
|---|---|---|---|
| 5,032,053 A | 7/1991 | Krieg | |
| 7,826,919 B2* | 11/2010 | D'Andrea | G05D 1/0234 700/214 |
| 8,972,045 B1* | 3/2015 | Mountz | G06Q 10/087 700/229 |
| 9,280,153 B1* | 3/2016 | Palamarchuk | B65G 1/137 |
| 9,452,883 B1* | 9/2016 | Wurman | G06Q 10/087 |
| 10,119,272 B1* | 11/2018 | Shah | B66F 9/06 |
| 10,471,597 B1* | 11/2019 | Murphy | B25J 9/1674 |
| 10,958,895 B1* | 3/2021 | Krishnan Gorumkonda | H04N 13/246 |
| 11,161,693 B2 | 11/2021 | Wu et al. | |
| 2007/0017984 A1* | 1/2007 | Mountz | G06Q 10/087 235/385 |
| 2011/0103924 A1* | 5/2011 | Watt | B65G 67/26 414/800 |
| 2013/0103552 A1* | 4/2013 | Hoffman | G06Q 10/00 705/28 |
| 2014/0100998 A1* | 4/2014 | Mountz | G06Q 10/08 705/28 |

(Continued)

FOREIGN PATENT DOCUMENTS

| | | |
|---|---|---|
| JP | 612603 A | 1/1986 |
| JP | S631607 A | 1/1988 |

(Continued)

*Primary Examiner* — Kyle O Logan
(74) *Attorney, Agent, or Firm* — The Webb Law Firm

(57) ABSTRACT

An article accommodation facility includes: an article container that contains one or more types of articles; a container accommodation member that has an accommodation compartment capable of accommodating the article container on a plurality of levels in a vertical direction; an accommodation member transport apparatus that transports the container accommodation member between a storage portion and a pick-up position; a container pick-up apparatus that takes out the article container from the container accommodation member at the pick-up position; and a container transport apparatus that transports the article container taken out from the container accommodation member by the container pick-up apparatus to a picking section.

8 Claims, 9 Drawing Sheets

(56) References Cited

U.S. PATENT DOCUMENTS

| | | | |
|---|---|---|---|
| 2015/0151912 A1* | 6/2015 | Mountz | B65G 1/1373 700/218 |
| 2016/0145044 A1* | 5/2016 | Mountz | B65G 1/1373 700/216 |
| 2016/0145045 A1* | 5/2016 | Mountz | B65G 1/137 700/218 |
| 2017/0166399 A1* | 6/2017 | Stubbs | B25J 9/1664 |
| 2018/0215539 A1* | 8/2018 | Kimura | G05D 1/0274 |
| 2020/0277139 A1* | 9/2020 | Nakano | B65G 1/1373 |
| 2021/0165424 A1* | 6/2021 | Bijelovic | G05D 1/0297 |

FOREIGN PATENT DOCUMENTS

| | | | |
|---|---|---|---|
| JP | 2019137543 A | 8/2019 | |
| JP | 2020500800 A | 1/2020 | |

\* cited by examiner

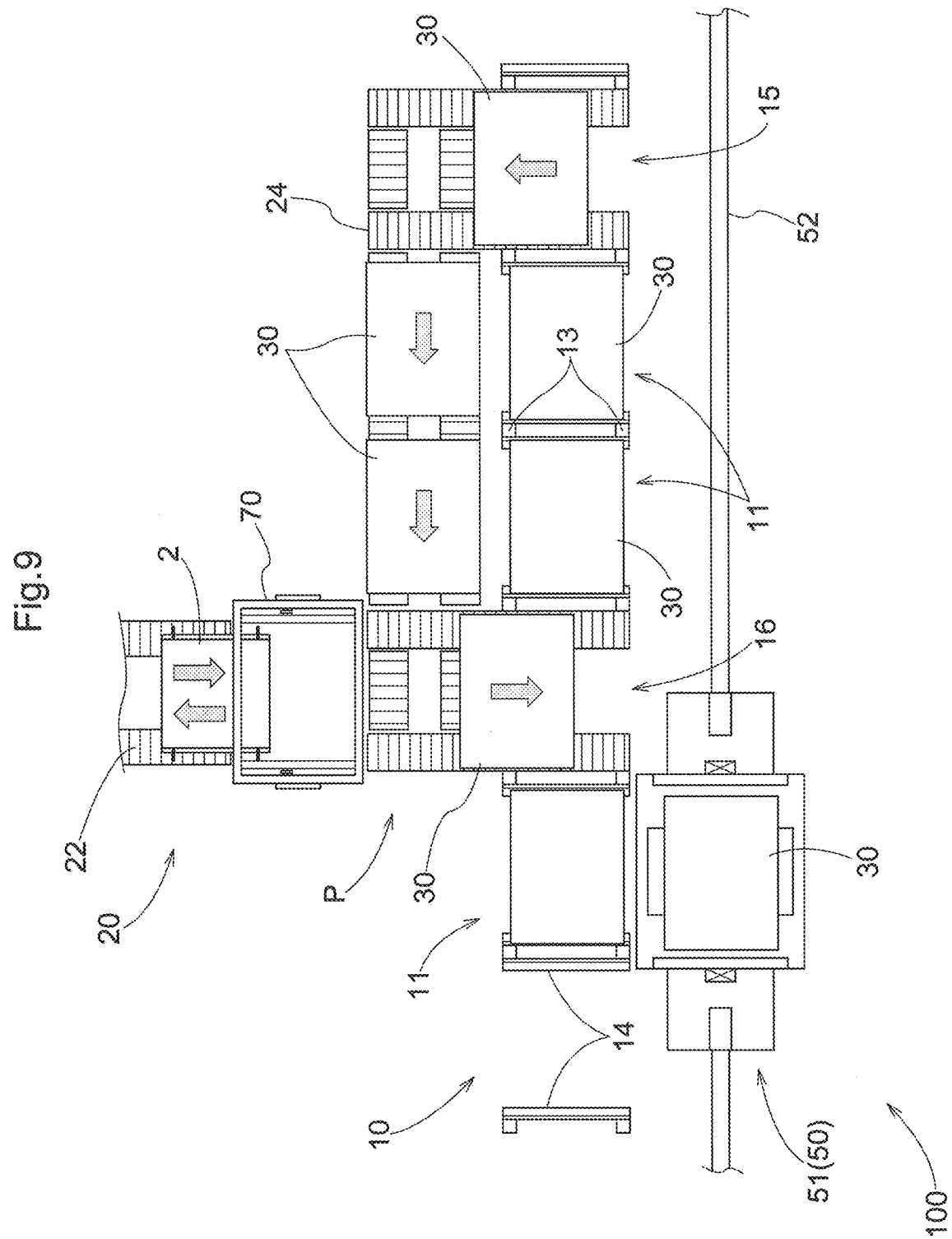

ARTICLE ACCOMMODATION FACILITY

CROSS-REFERENCE TO RELATED APPLICATION

This application claims priority to Japanese Patent Application No. 2020-058653 filed Mar. 27, 2020, the disclosure of which is hereby incorporated by reference in its entirety.

BACKGROUND OF THE INVENTION

1. Field of the Invention

The present invention relates to an article accommodation facility including an article container that contains an article, a container accommodation member that can accommodate article containers on a plurality of levels in a vertical direction, and a transport apparatus that transports an article container accommodated in the container accommodation member to a picking section where a picking operation is performed.

2. Description of the Related Art

An example of article accommodation facilities such as the one described above is disclosed in JP 2019-137543A (Patent Document 1). Hereinafter, the reference numerals shown in parentheses in the description of the related art are those of Patent Document 1. In an article accommodation facility of Patent Document 1, storage boxes (103) that store articles are accommodated in a storage rack (102) that has a plurality of levels (202). A plurality of storage racks (102) are placed in a storage area (101) for storing articles to be shipped to various destinations. A storage rack (102) that accommodates a target storage box (103) to be subjected to a picking operation is transported by a transport vehicle (111) to a manual work area (104) in which an operator (105) performs the picking operation or a robot work area (109) in which a robot (110) performs the picking operation.

As described above, in the article accommodation facility of Patent Document 1, article containers (storage boxes of Patent Document 1) are accommodated in a container accommodation member (storage rack of Patent Document 1) that can accommodate article containers on a plurality of levels. Therefore, the container accommodation member can accommodate a plurality of article containers such that the article containers overlap each other in a plan view (when viewed in a direction extending along a vertical direction), and storage efficiency for article containers can be improved by using a vertical space. However, in the article accommodation facility of Patent Document 1, a target article container that is to be subjected to the picking operation is transported to a picking section together with a container accommodation member accommodating the target article container. For this reason, if a non-target article container that is not to be subjected to the picking operation is also accommodated in the container accommodation member, the non-target article container that is not to be subjected to the picking operation is also transported to the picking section. Although it is necessary that a plurality of target article containers (e.g., a plurality of article containers that fulfill an order) to be subjected to the picking operation can be efficiently transported to the picking section, there is concern that, in the article accommodation facility of Patent Document 1, transport efficiency may be reduced, or improvement in transport efficiency may be hindered, due to a non-target article container that is not to be subjected to the picking operation being transported to the picking section. Furthermore, there is also concern about wasteful energy consumption.

SUMMARY OF THE INVENTION

Thus, there is a demand to realize an article accommodation facility that can improve the storage efficiency for article containers and also avoid transporting a non-target article container that is not to be subjected to a picking operation to the picking section.

An article accommodation facility according to the present disclosure includes: an article container that contains one or more types of articles; a container accommodation member that has an accommodation compartment capable of accommodating the article container on a plurality of levels in a vertical direction and that has an opening for putting the article container into, and taking out the article container from, the accommodation compartment, the opening being formed in a side face of the accommodation compartment; an accommodation member transport apparatus that transports the container accommodation member between a storage portion in which the container accommodation member is stored and a pick-up position; a container pick-up apparatus that takes out the article container from the container accommodation member through the opening at the pick-up position; and a container transport apparatus that transports the article container taken out from the container accommodation member by the container pick-up apparatus to a picking section where the article container is subjected to a picking operation.

According to this configuration, the container accommodation member capable of accommodating an article container on a plurality of levels in the vertical direction can be stored in the storage portion while accommodating a plurality of article containers. Accordingly, a vertical space can be effectively used, and storage efficiency for article containers can thus be improved. In addition, according to this configuration, the accommodation member transport apparatus that transports the container accommodation member transports the container accommodation member between the storage portion and the pick-up position, rather than between the storage portion and the picking section, and the container transport apparatus transports the article container taken out from the container accommodation member by the container pick-up apparatus at the pick-up position to the picking section. Thus, even in the case where the container accommodation member that accommodates a target article container that is to be subjected to the picking operation also accommodates a non-target article container that is not to be subjected to the picking operation, only the target article container that is to be subjected to the picking operation can be transported to the picking section.

As described above, according to this configuration, it is possible to avoid transporting to the picking section an article container that does not need to be transported, while improving the storage efficiency for article containers. Note that this configuration makes it possible to store a container accommodation member in a storage portion provided at a different position from the pick-up position where the container pick-up apparatus takes out an article container from a container accommodation member. Therefore, container accommodation members can be placed appropriately in the storage portion or at the pick-up position such that a container accommodation member accommodating an article container that is unlikely to be subjected to the picking operation (e.g., an article container that contains seasonal products after the peak season) is stored in the storage portion, while a container accommodation member accommodating an article container that is highly likely to be subjected to the picking operation (e.g., an article container that contains seasonal products during the peak season) is placed at the pick-up position. Accordingly, this configuration also has the advantage of being able to improve transport efficiency of the transport of a target article container that is to be subjected to the picking operation to the picking section. Furthermore, since a container accommodation member can be stored in a storage portion provided at a different position from the pick-up position in this manner, storage portions can be provided without the necessity of giving much consideration to the ease of taking out an article container from a container accommodation member. Accordingly, this configuration also has the advantage of making it easy to provide storage portions so as to improve the storage efficiency for article containers, by, for example, arranging storage portions at relatively high positions.

Further features and advantages of the article accommodation facility will become evident from the following embodiments, which will be described with reference to the drawings.

BRIEF DESCRIPTION OF THE DRAWINGS

FIG. 9 is a schematic plan view of an article accommodation facility according to another embodiment.

DETAILED DESCRIPTION OF PREFERRED EMBODIMENTS

First Embodiment

A first embodiment of the article accommodation facility will be described with reference to the drawings (FIGS. 1 to 6).

Figure 1:
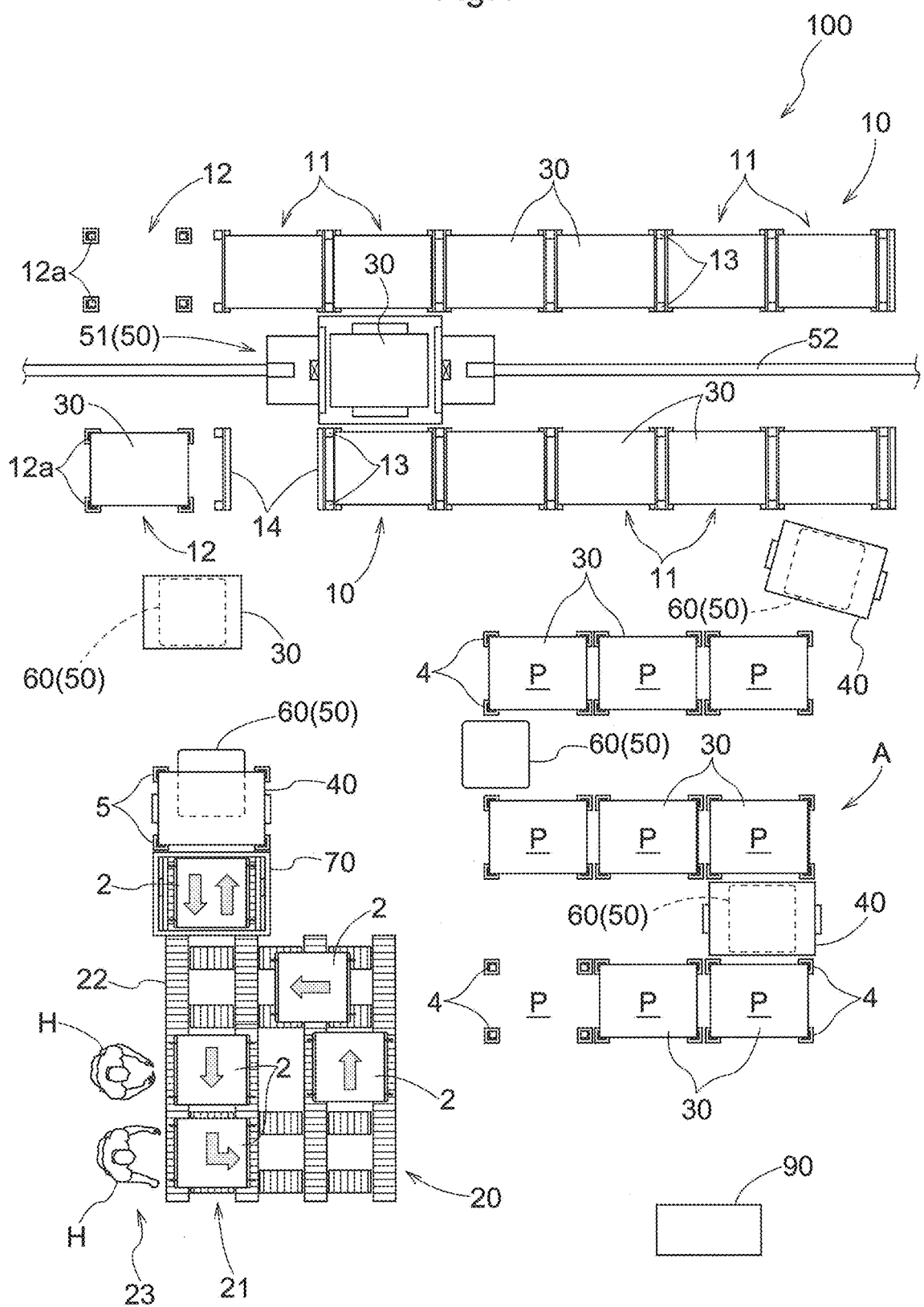
FIG. 1 is a schematic plan view of an article accommodation facility according to a first embodiment.
Figure 2:
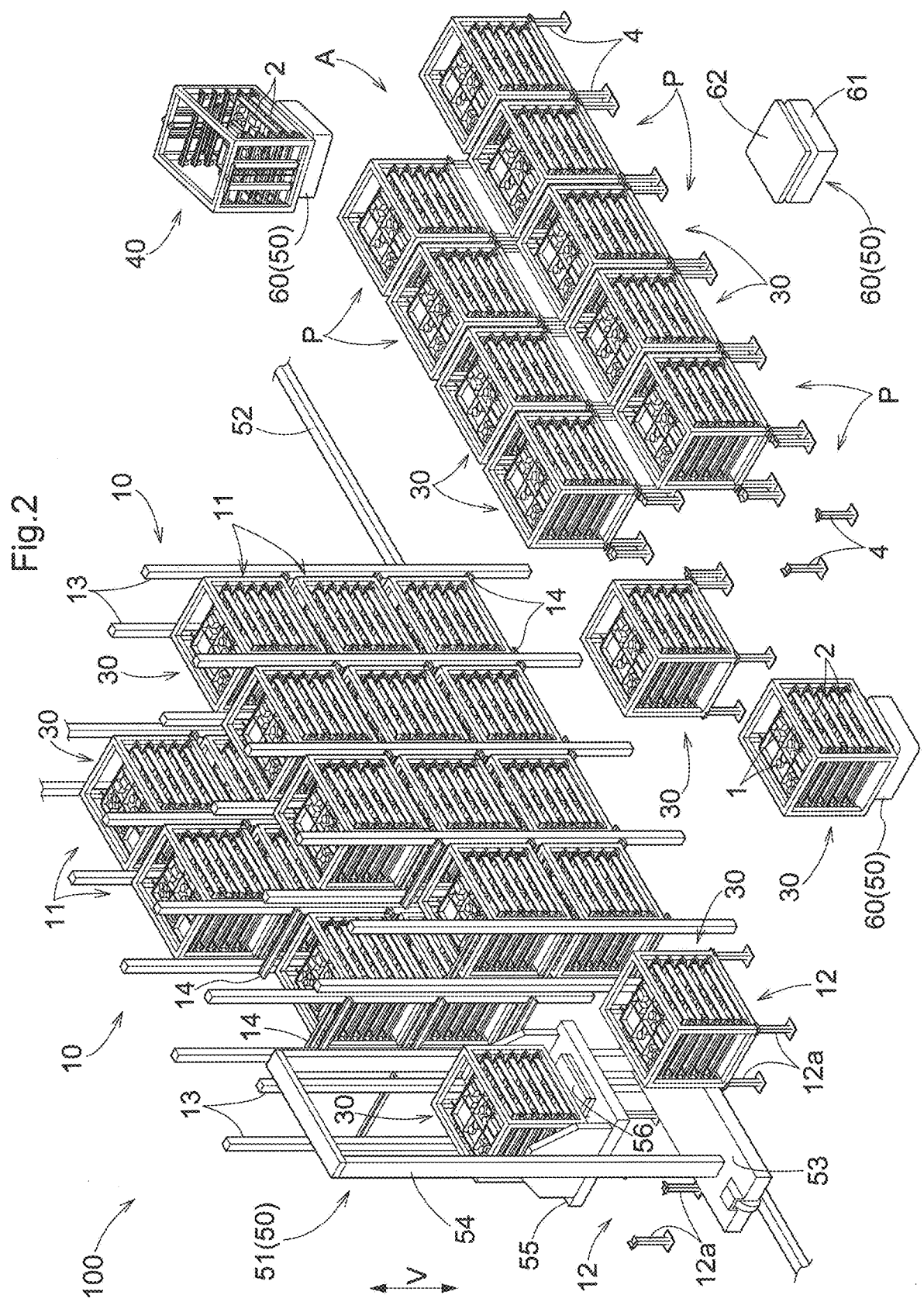
FIG. 2 is a perspective view showing the vicinity of a storage rack of the article accommodation facility according to the first embodiment.

As shown in FIGS. 1 and 2, an article accommodation facility 100 includes an article container 2, a container accommodation rack 30, an accommodation rack transport apparatus 50, a container collection rack 40, and a rack transport vehicle 60. The article accommodation facility 100 is a facility that accommodates a plurality of types of articles 1. Specifically, the article accommodation facility 100 is a facility that stores article containers 2 accommodating articles 1 and transports a target article container 2 that is to be subjected to a picking operation to a picking section 20 where the picking operation is performed. An article container 2 containing an article 1 of a type specified in an order is transported to the picking section 20, and a specified quantity of articles 1 specified in the order are taken out from the article container 2 at the picking section 20. The quantity that is specified in an order is a quantity for each type of article 1. An order is, for example, generated by a control apparatus 90 or other apparatuses (a management apparatus or the like) based on a purchase order received from a shipping destination. Although FIG. 1 illustrates a case in which the picking operation is performed by an operator H, the picking operation may also be performed by a robot or the like, instead of the operator H.

Each article container 2 contains one or more types of articles 1. An article 1 contained in an article container 2 is supported, for example, on a bottom surface of the article container 2, or on an upper surface of another article 1 contained in the article container 2. In an example shown in FIG. 3, each article container 2 contains a plurality of types of articles 1. Specifically, each article container 2 has a plurality of containing portions that are demarcated by partition materials in a grid-like layout, and a plurality of types of articles 1 are contained therein such that articles 1 of the same type are contained in the same containing portion. The article containers 2 are each formed into a box shape (here, a shallow box shape) with an open top. Here, the article containers 2 are each formed into a rectangular shape in a plan view (when viewed in a direction extending along the vertical direction V). In the picking operation that is performed on an article container 2, an article 1 contained in the article container 2 is taken out from the article container 2 through a top opening thereof. The article 1 that has been taken out from the article container 2 by the picking operation is then placed into a shipping container, for example.

Figure 4:
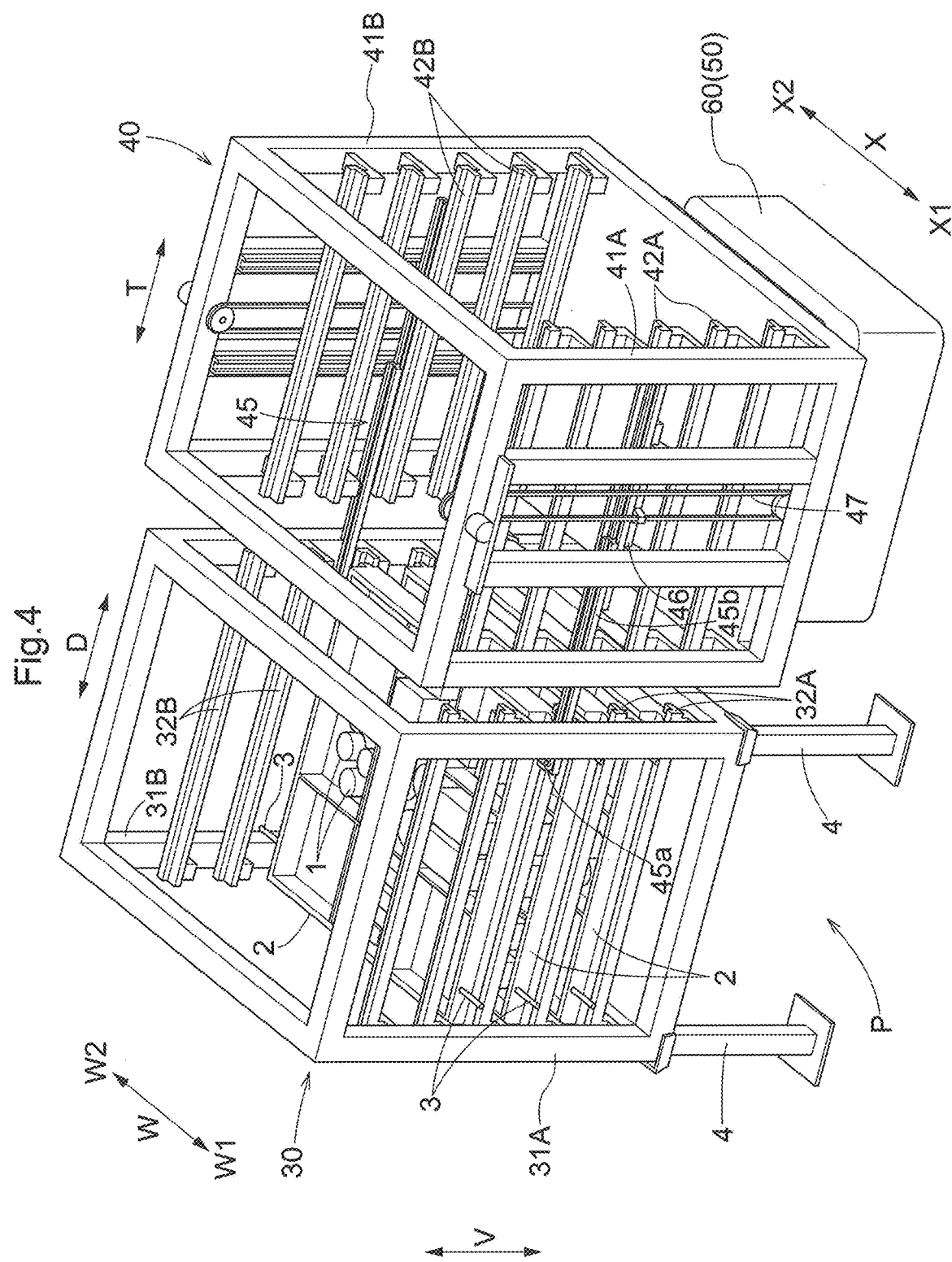
FIG. 4 is a perspective view showing a container accommodation member and a container pick-up apparatus according to the first embodiment.
Figure 5:
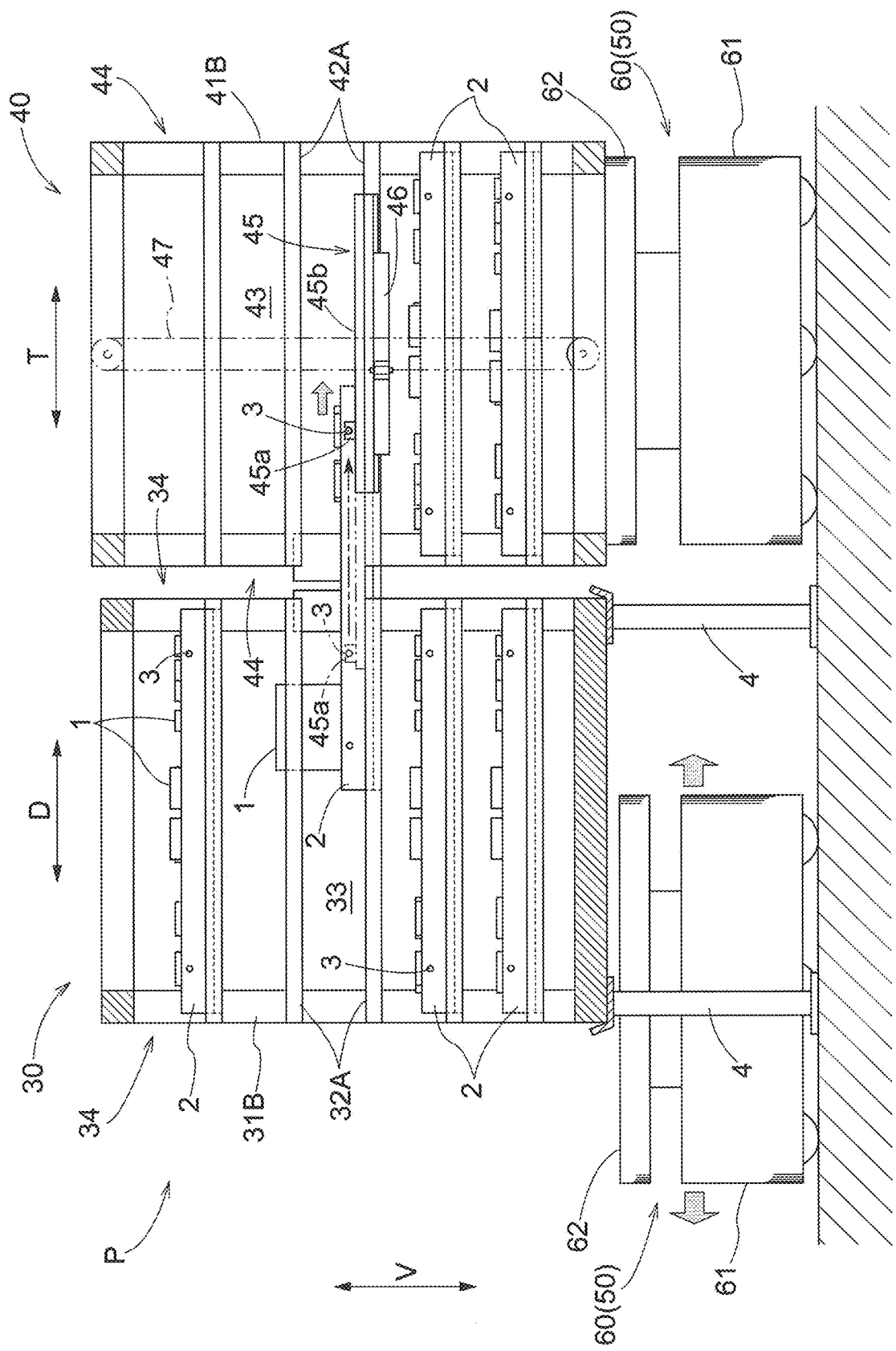
FIG. 5 is a partially cut-away side view of the container accommodation member and the container pick-up apparatus according to the first embodiment.

As shown in FIG. 5, each container accommodation rack 30 has an accommodation compartment 33 that can accommodate article containers 2 on a plurality of levels in the vertical direction V. That is to say, tiers on which article containers 2 can be accommodated are formed in the accommodation compartment 33 at a plurality of positions in the vertical direction V. A plurality of article containers 2 can be separately accommodated on different tiers in the accommodation compartment 33 such that the article containers 2 overlap each other in a plan view. The accommodation compartment 33 can accommodate up to the same number of article containers 2 as the number of tiers. In an example shown in FIGS. 4 and 5, five tiers lined up in the vertical direction V are formed in the accommodation compartment 33. In the present embodiment, each container accommodation rack 30 corresponds to a "container accommodation member".

As shown in FIG. 5, an opening 34 for putting an article container 2 into, and taking out the article container 2 from, the accommodation compartment 33 is formed in a side face of the accommodation compartment 33. The accommodation compartment 33 is formed into a rectangular parallelepiped shape having an upper face, a lower face, and four side faces, and openings 34 are formed in two respective side faces that oppose each other. That is to say, the container accommodation rack 30 has the openings 34 on opposite sides in a direction D in which an article container 2 is put into and taken out from the accommodation compartment 33. In other words, the openings 34 are formed in the respective side faces of the accommodation compartment 33 that are located on opposite sides in the putting-in/taking-out direction D.

As shown in FIG. 4, a direction that is orthogonal to the putting-in/taking-out direction D and extends along a horizontal direction is referred to as a "width direction W". Also, one side in the width direction W is referred to as a "first side W1", and the other side in the width direction W is referred to as a "second side W2". In the present embodiment, each container accommodation rack 30 includes: a first vertical frame 31A that is provided on the first side W1 with respect to the accommodation compartment 33 and extends in the vertical direction V; and a second vertical frame 31B that is provided on the second side W2 with respect to the accommodation compartment 33 and extends in the vertical direction V. The first vertical frame 31A and the second vertical frame 31B are connected to each other on upper and lower sides with respect to the accommodation compartment 33. The openings 34 of the accommodation compartment 33 are formed between the first vertical frame 31A and the second vertical frame 31B in the width direction W. Here, the first vertical frame 31A and the second vertical frame 31B are each formed into a rectangular shape when viewed in a direction extending along the width direction W.

Furthermore, in the present embodiment, each container accommodation rack 30 includes: first support portions 32A that protrude from the first vertical frame 31A toward the second side W2 at respective locations corresponding to the levels (tiers) of the accommodation compartment 33; and second support portions 32B that protrude from the second vertical frame 31B toward the first side W1 at respective locations corresponding to the levels (tiers) of the accommodation compartment 33. As shown in FIG. 4, in the accommodation compartment 33, article containers 2 are supported by the first support portions 32A and the second support portions 32B from both sides in the width direction W. In the example shown in FIG. 4, the first support portions 32A are formed so as to protrude from the first vertical frame 31A toward the second side W2 over the entire length in the putting-in/taking-out direction D, and the second support portions 32B are formed so as to protrude from the second vertical frame 31B toward first side W1 over the entire length in the putting-in/taking-out direction D.

In the present embodiment, the positions (specifically, relative positions with respect to the first vertical frame 31A in the vertical direction V) of the first support portions 32A in the vertical direction V are fixed, and the positions (specifically, relative positions with respect to the second vertical frame 31B in the vertical direction V) of the second support portions 32B in the vertical direction V are fixed. Accordingly, the distance between the tiers of the accommodation compartment 33 that are adjacent to each other in the vertical direction V is fixed. Furthermore, the plurality of first support portions 32A are provided at regular intervals in the vertical direction V, and the plurality of second support portions 32B are provided at regular intervals in the vertical direction V. Accordingly, in the accommodation compartment 33, a plurality of tiers (five tiers in the example shown in FIGS. 4 and 5) are formed at regular intervals in the vertical direction V.

As described above, in the present embodiment, a plurality of tiers are formed in the accommodation compartment 33 at regular intervals in the vertical direction V. Then, when an article container 2 is to be accommodated in the container accommodation rack 30, a target tier onto which the article container 2 is to be placed is selected based on the height of an article 1 contained in the article container 2, and the article container 2 is placed onto the selected target tier. For example, like an article container 2 that is shown being taken out from the container accommodation rack 30 in FIG. 5, in the case where an article container 2 to be accommodated in the container accommodation rack 30 contains an article 1 having such a height that the article 1 interferes with an article container 2 accommodated on the next tier above, a tier without an article container 2 accommodated on the next tier above that tier is selected as a target tier onto which the article container 2 to be placed.

The container accommodation racks 30 are stored in storage portions 11. In the present embodiment, the article accommodation facility 100 includes a storage rack 10 in which a plurality of storage portions 11 are formed. As shown in FIG. 2, the plurality of storage portions 11 formed in a single storage rack 10 are arranged in a plurality of rows in the vertical direction V and a plurality of columns in the horizontal direction (rack width direction). Each storage rack 10 includes: a plurality of support columns 13 extending in the vertical direction V; and a plurality of brackets 14 (an example of support members) extending in a rack depth direction (horizontal direction that is orthogonal to the rack width direction). A plurality of brackets 14 are attached to each support column 13 while being spaced apart from each other in the vertical direction V, and the storage portions 11 are demarcated by the support columns 13 in the rack width direction and demarcated by the brackets 14 in the vertical direction V. The container accommodation racks 30 are stored in the storage portions 11 in a state in which each container accommodation rack 30 is supported from below by a pair of brackets 14 that are arranged spaced apart from each other in the rack width direction. In the present embodiment, a pair of storage racks 10 are provided so as to oppose each other in a rack front-rear direction.

The accommodation rack transport apparatus 50 transports a container accommodation rack 30 between a storage portion 11 and a pick-up position P. As shown in FIGS. 1 and 2, in the present embodiment, the pick-up position P is a position located outside the storage racks 10. Specifically, a plurality of pick-up positions P are set in a rack placement area A provided outside the storage racks 10. The accommodation rack transport apparatus 50 transports a container accommodation rack 30 in the storage racks 10 (specifically, in front of the storage racks 10) and also transports the container accommodation rack 30 outside the storage racks 10, between the storage racks 10 and a pick-up position P. The article accommodation facility 100 includes support portions 12 that each support a container accommodation rack 30 to be carried into a storage portion 11, or a container accommodation rack 30 to be carried out of a storage portion 11, and the accommodation rack transport apparatus 50 transports a container accommodation rack 30 in the storage racks 10, between a storage portion 11 and a support portion 12, and also transports the container accommodation rack 30 outside the storage racks 10, between the support portion 12 and a pick-up position P. In the present embodiment, the accommodation rack transport apparatus 50 corresponds to an "accommodation member transport apparatus".

In the present embodiment, the accommodation rack transport apparatus 50 includes a stacker crane 51 as a transport apparatus that transports a container accommodation rack 30 in the storage racks 10. The stacker crane 51 transports a container accommodation rack 30 in front of the storage racks 10. In the present embodiment, the stacker crane 51 transports a container accommodation rack 30 between the two storage racks 10. The stacker crane 51 transports a container accommodation rack 30 between a storage portion 11 and a support portion 12. As shown in FIG. 2, the stacker crane 51 includes; a traveling body 53 that travels in the rack width direction while being guided by a rail 52 installed on a floor portion; a raising/lowering body 55 that is raised and lowered (i.e., moved in the vertical direction V) while being guided by a mast 54 erected on the traveling body 53; and a rack transfer machine 56 that is supported on the raising/lowering body 55. The rack transfer machine 56 transfers a container accommodation rack 30 between the raising/lowering body 55 and a transfer target location (a storage portion 11 or a support portion 12). In the example shown in FIG. 2, the rack transfer machine 56 includes a support portion that supports the container accommodation rack 30 from below and an advancing/retracting mechanism that advances and retracts the support portion, and the container accommodation rack 30 is transferred between the raising/lowering body 55 and the transfer target location by raising or lowering the raising/lowering body 55 with the support portion protruding toward the side of the transfer target location.

In the present embodiment, the accommodation rack transport apparatus 50 includes the rack transport vehicle 60 as an outside transport apparatus that transports a container accommodation rack 30 outside the storage racks 10, between the storage racks 10 (specifically, a support portion 12) and a pick-up position P. As will be described later, in the present embodiment, the article accommodation facility 100 includes the rack transport vehicle 60 as a container transport apparatus that transports a container collection rack 40 between a position corresponding to a pick-up position P and a position corresponding to the picking section 20. In this manner, in the present embodiment, the outside transport apparatus and the container transport apparatus can share the same transport device, and the shared transport device, that is, the rack transport vehicle 60 is used both as the outside transport apparatus and the container transport apparatus. Specifically, the article accommodation facility 100 includes a plurality of rack transport vehicles 60, and each rack transport vehicle 60 can be used both to transport a container accommodation rack 30 and to transport a container collection rack 40. In the present embodiment, the rack transport vehicles 60 correspond to an "outside transport apparatus".

As shown in FIG. 2, in the present embodiment, the rack transport vehicles 60 are transport vehicles autonomously traveling on a floor surface, and each rack transport vehicle 60 includes: a traveling body 61 that has a traveling mechanism such as traveling wheels; and a raising/lowering body 62 that is supported on the traveling body 61 so as to be able to be raised and lowered relative to the traveling body 61. The raising/lowering body 62 supports a container accommodation rack 30 or a container collection rack 40 from below. The rack transport vehicle 60 moves to a location under a target container accommodation rack 30 that is to be transported, with the raising/lowering body 62 being lowered, and then raises the raising/lowering body 62 to lift up the container accommodation rack 30, thereby carrying the container accommodation rack 30. The rack transport vehicle 60 moves in a state of carrying the container accommodation rack 30, thereby transporting the container accommodation rack 30. Then, after moving to the position of a transport destination, the rack transport vehicle 60 lowers the raising/lowering body 62 and unloads the container accommodation rack 30 onto the transport destination. Similarly, the rack transport vehicle 60 moves to a location under a target container collection rack 40 that is to be transported, with the raising/lowering body 62 being lowered, and then raises the raising/lowering body 62 to lift up the container collection rack 40, thereby carrying the container collection rack 40. The rack transport vehicle 60 moves in a state of carrying the container collection rack 40, thereby transporting the container collection rack 40. Then, after moving to the position of a transport destination, the rack transport vehicle 60 lowers the raising/lowering body 62 and unloads the container collection rack 40 onto the transport destination.

In the present embodiment, support bodies 12a with a fixed height are installed in each support portion 12, and a container accommodation rack 30 at a support portion 12 is supported from below by the support bodies 12a. When located at the support portion 12, the rack transport vehicle 60 raises the raising/lowering body 62 and lifts up the container accommodation rack 30 from the support bodies 12a, thereby carrying the container accommodation rack 30. On the other hand, the rack transport vehicle 60 when located at a support portion 12 lowers the raising/lowering body 62 and rests a container accommodation rack 30 onto the support bodies 12a, thereby unloading the container accommodation rack 30 onto the support portion 12. Note that a configuration may also be adopted in which the height of the support surfaces of the support bodies 12a is not fixed and the support surfaces can be raised and lowered. For example, this configuration in which the support surfaces of the support bodies 12a can be raised and lowered can be adopted in the case where each container accommodation rack 30 includes leg portions extending downward from the lowermost tier thereof.

In the present embodiment, support bodies 4 with a fixed height are installed at each pick-up position P, and a container accommodation rack 30 at a pick-up position P is supported by the support bodies 4 from below. When located at the pick-up position P, the rack transport vehicle 60 raises the raising/lowering body 62 and lifts up the container accommodation rack 30 from the support bodies 4, thereby carrying the container accommodation rack 30. On the other hand, the rack transport vehicle 60 when located at a pick-up position P lowers the raising/lowering body 62 and rests a container accommodation rack 30 onto the support bodies 4, thereby unloading the container accommodation rack 30 onto the pick-up position P. Note that a configuration may be adopted in which the height of the support surfaces of the support bodies 4 is not fixed and the support surfaces can be raised and lowered, or a configuration may be adopted in which the support bodies 4 are not installed at the pick-up positions P, and container accommodation racks 30 at the pick-up positions P are directly placed on the floor surface. For example, the configuration in which container accommodation racks 30 are directly placed on the floor surface can be adopted in the case where each container accommodation rack 30 includes leg portions extending downward from the lowermost tier thereof.

In the present embodiment, the article accommodation facility 100 includes the container collection rack 40 as a container pick-up apparatus that takes out an article container 2 from a container accommodation rack 30 through its opening 34 at a pick-up position P. That is to say, the container collection rack 40 takes out an article container 2 from a container accommodation rack 30 through its opening 34 at a pick-up position P. As shown in FIG. 5, the container collection rack 40 has an accommodation portion 43 that can accommodate article containers 2 on a plurality of levels in the vertical direction V. That is to say, tiers on which article containers 2 can be accommodated are formed in the accommodation portion 43 at a plurality of positions in the vertical direction V. A plurality of article containers 2 can be separately accommodated on different tiers in the accommodation portion 43 such that the article containers 2 overlap each other in a plan view. The accommodation portion 43 can accommodate up to the same number of article containers 2 as the number of tiers. In the example shown in FIGS. 4 and 5, five tiers lined up in the vertical direction V are formed in the accommodation portion 43. In the present embodiment, the container collection rack 40 corresponds to a "container pick-up apparatus".

Each container collection rack 40 includes a transfer machine 45. The container collection rack 40 takes out an article container 2 from a container accommodation rack 30 using the transfer machine 45. The transfer machine 45 transfers the article container 2 between any one of the levels (tiers) in the accommodation compartment 33 of the container accommodation rack 30 and the accommodation portion 43 of the container collection rack 40. In the present embodiment, the number of tiers (number of levels) in the accommodation portion 43 of the container collection rack 40 is equal to the number of tiers (number of levels) in the accommodation compartment 33 of each container accommodation rack 30, and the transfer machine 45 transfers an article container 2 between any one of the levels in the accommodation compartment 33 of a container accommodation rack 30 and the same level as that level in the accommodation portion 43 of the container collection rack 40. Accordingly, an article container 2 taken out from the accommodation compartment 33 of a container accommodation rack 30 is transferred by the transfer machine 45 to the same level in the accommodation portion 43 of the container collection rack 40 as the level on which the article container 2 has been accommodated in the accommodation compartment 33. FIG. 5 shows a situation in which an article container 2 that has been accommodated on the third level from the top in the accommodation compartment 33 of a container accommodation rack 30 is being transferred by the transfer machine 45 to the third level from the top in the accommodation portion 43 of the container collection rack 40.

The container collection rack 40 includes a communication portion 44 via which the inside and the outside of the accommodation portion 43 are in communication with each other. The transfer machine 45 is configured to move an article container 2 between the inside and the outside of the accommodation portion 43 through the communication portion 44. The communication portion 44 is formed in a side face of the accommodation portion 43, and the transfer machine 45 moves an article container 2 in a transfer direction T extending along a horizontal plane, thereby moving the article container 2 between the inside and the outside of the accommodation portion 43 through the communication portion 44. The accommodation portion 43 is formed into a rectangular parallelepiped shape having an upper face, a lower face, and four side faces, and as shown in FIG. 5, communication portions 44 are formed in two respective side faces that oppose each other. That is to say, the container collection rack 40 has the communication portions 44 on opposite sides in the transfer direction T in which the transfer machine 45 transfers an article container 2. In other words, the communication portions 44 are formed in the respective side faces of the accommodation portion 43 that are located on opposite sides in the transfer direction T.

In the example shown in FIGS. 4 and 5, the transfer machine 45 includes: an engaging portion 45a that is engageable with an engaged portion 3 provided on each article container 2; and an advancing/retracting mechanism 45b that advances and retracts the engaging portion 45a in the transfer direction T. Here, the engaged portion 3 is formed into a rod-like shape protruding from a side surface of the article container 2 in the horizontal direction. Switching between a state in which the engaging portion 45a is in engagement with the engaged portion 3 and a state in which the engaging portion 45a is out of engagement with the engaged portion 3 can be achieved by, for example, moving the engaging portion 45a up or down or rotating the engaging portion 45a. The transfer machine 45 moves the article container 2 in the transfer direction T by the advancing/retracting mechanism 45b advancing and retracting the engaging portion 45a in a state in which the engaging portion 45a is in engagement with the engaged portion 3, and thereby pushing or pulling the article container 2. The container collection rack 40 includes a raising/lowering body 46 that can be raised and lowered, and the transfer machine 45 is supported by the raising/lowering body 46. The raising/lowering body 46 is raised and lowered by a raising/lowering mechanism 47 that is constructed using a cord-like body such as a chain. The transfer machine 45 moves the article container 2 in the transfer direction T in a state in which the raising/lowering body 46 has been raised or lowered to a height (position in the vertical direction V) corresponding to a target level (the third tier from the top, in the situation shown in FIG. 5) onto which the article container 2 is to be transferred, and thereby transfers the article container 2.

As shown in FIG. 4, a direction that is orthogonal to the transfer direction T and extends along the horizontal direction is referred to as a "width direction X". Also, one side in the width direction X is referred to as a "first side X1", and the other side in the width direction X is referred to as a "second side X2". In the present embodiment, the container collection rack 40 includes: a first vertical frame 41A that is provided on the first side X1 with respect to the accommodation portion 43 and extends in the vertical direction V; and a second vertical frame 41B that is provided on the second side X2 with respect to the accommodation portion 43 and extends in the vertical direction V. The first vertical frame 41A and the second vertical frame 41B are connected to each other on upper and lower sides with respect to the accommodation portion 43. The communication portions 44 are formed between the first vertical frame 41A and the second vertical frame 41B in the width direction X. Here, the first vertical frame 41A and the second vertical frame 41B are each formed into a rectangular shape when viewed in a direction extending along the width direction X.

Furthermore, in the present embodiment, the container collection rack 40 includes: first support portions 42A that protrude from the first vertical frame 41A toward the second side X2 at respective locations corresponding to the levels (tiers) of the accommodation portion 43; and second support portions 42B that protrude from the second vertical frame 41B toward the first side X1 at respective locations corresponding to the levels (tiers) of the accommodation portion 43. In the accommodation portion 43, article containers 2 are supported by the first support portions 42A and the second support portions 42B from both sides in the width direction X. In the example shown in FIG. 4, the first support portions 42A are formed so as to protrude from the first vertical frame 41A toward the second side X2 over the entire length in the transfer direction T, and the second support portions 42B are formed so as to protrude from the second vertical frame 41B toward first side X1 over the entire length in the transfer direction T.

In the present embodiment, the positions (specifically, relative positions with respect to the first vertical frame 41A in the vertical direction V) of the first support portions 42A in the vertical direction V are fixed, and the positions (specifically, relative positions with respect to the second vertical frame 41B in the vertical direction V) of the second support portions 42B in the vertical direction V are fixed. Accordingly, the distance between the tiers of the accommodation portion 43 that are adjacent to each other in the vertical direction V is fixed. Furthermore, the plurality of first support portions 42A are provided at regular intervals in the vertical direction V, and the plurality of second support portions 42B are provided at regular intervals in the vertical direction V. Accordingly, in the accommodation portion 43, a plurality of tiers (five tiers in the example shown in FIGS. 4 and 5) are formed at regular intervals in the vertical direction V.

In the present embodiment, the article accommodation facility 100 includes the rack transport vehicle 60 as the container transport apparatus that transports an article container 2 taken out from a container accommodation rack 30 by the container pick-up apparatus to the picking section 20. That is to say, the rack transport vehicle 60 transports an article container 2 taken out from a container accommodation rack 30 by the container collection rack 40 to the picking section 20. The rack transport vehicle 60 transports the container collection rack 40 to the picking section 20 in a state in which the article container 2 taken out from the container accommodation rack 30 is accommodated in the accommodation portion 43 of the container collection rack 40, thereby transporting the article container 2 taken out from the container accommodation rack 30 by the container collection rack 40 to the picking section 20. In this manner, an article container 2 is transported to the picking section 20 together with the container collection rack 40. Thus, a plurality of article containers 2 accommodated in the container collection rack 40 can be collectively transported to the picking section 20. In the present embodiment, the rack transport vehicle 60 corresponds to a "container transport apparatus".

The rack transport vehicle 60 transports the container collection rack 40 from a position corresponding to a pick-up position P to the position corresponding to the picking section 20. At a position corresponding to a pick-up position P, the container collection rack 40 takes out an article container 2 from a container accommodation rack 30 located at the pick-up position P using the transfer machine 45. On the other hand, at a position corresponding to a pick-up position P, the container collection rack 40 places an article container 2 into a container accommodation rack 30 located at the pick-up position P using the transfer machine 45. As shown in FIGS. 4 and 5, a position corresponding to a pick-up position P is a position that is adjacent to a container accommodation rack 30 located at the pick-up position P in the putting-in/taking-out direction D, and, at the position corresponding to the pick-up position P, the container collection rack 40 is oriented such that the transfer direction T of the container collection rack 40 is parallel to the putting-in/taking-out direction D of the container accommodation rack 30 located at the pick-up position P.

In the present embodiment, no support bodies for supporting the container collection rack 40 from below are provided at positions corresponding to the pick-up positions P, and the container collection rack 40 at a position corresponding to a pick-up position P is carried by the rack transport vehicle 60 (specifically, supported by the raising/lowering body 62 of the rack transport vehicle 60 from below), and in this state, an article container 2 is transferred between the accommodation portion 43 of the container collection rack 40 and the accommodation compartment 33 of a container accommodation rack 30. In the case where, for example, support bodies for supporting the container collection rack 40 from below are provided at the positions corresponding to the pick-up positions P, or the container collection rack 40 includes leg portions extending downward from the lowermost tier thereof, a configuration may be adopted in which the container collection rack 40 at a position corresponding to a pick-up position P is supported by the support bodies or supported on the floor surface, and in this state, an article container 2 is transferred between the accommodation portion 43 of the container collection rack 40 and the accommodation compartment 33 of a container accommodation rack 30.

Figure 3:
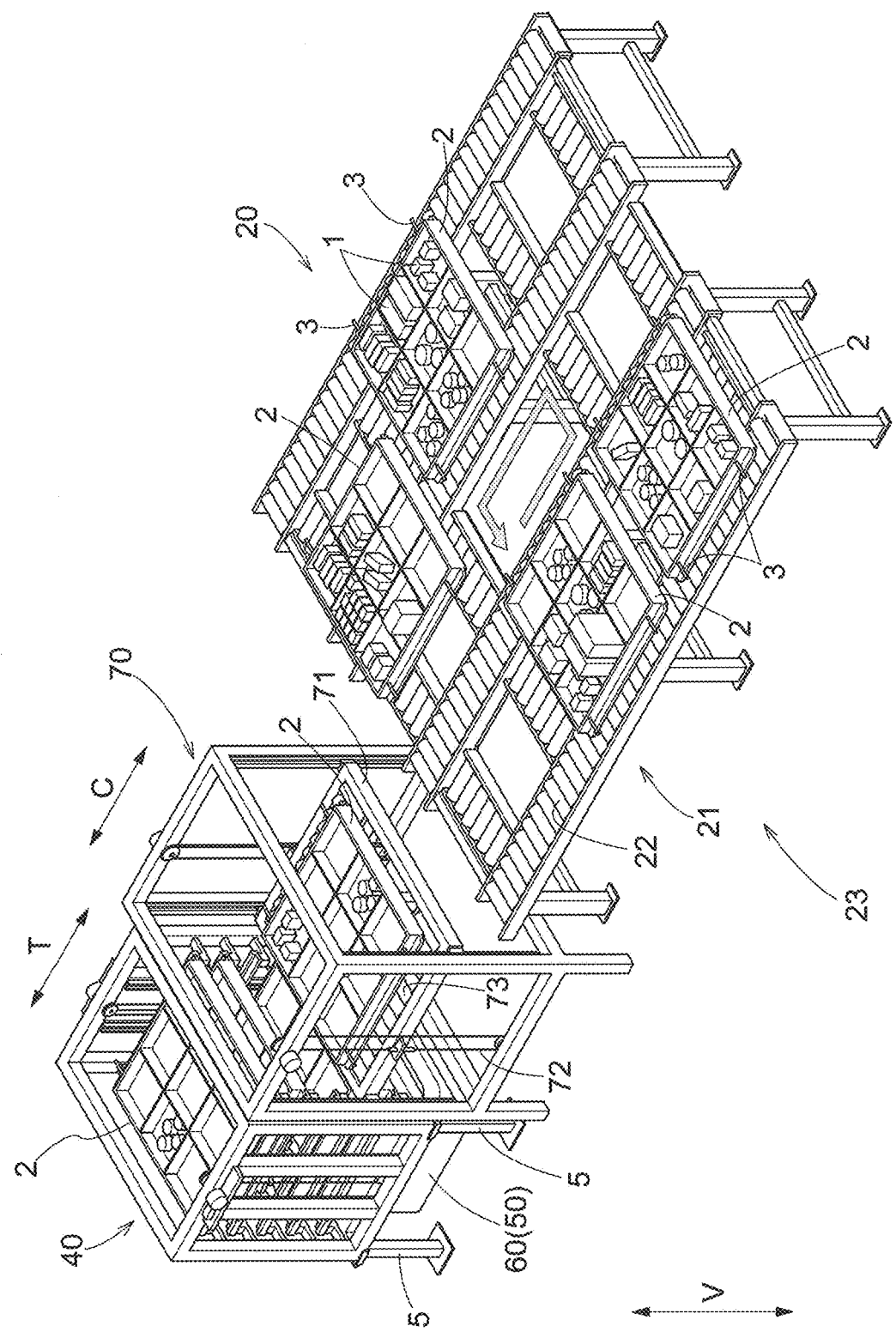
FIG. 3 is a perspective view showing the vicinity of a picking section of the article accommodation facility according to the first embodiment.
Figure 6:
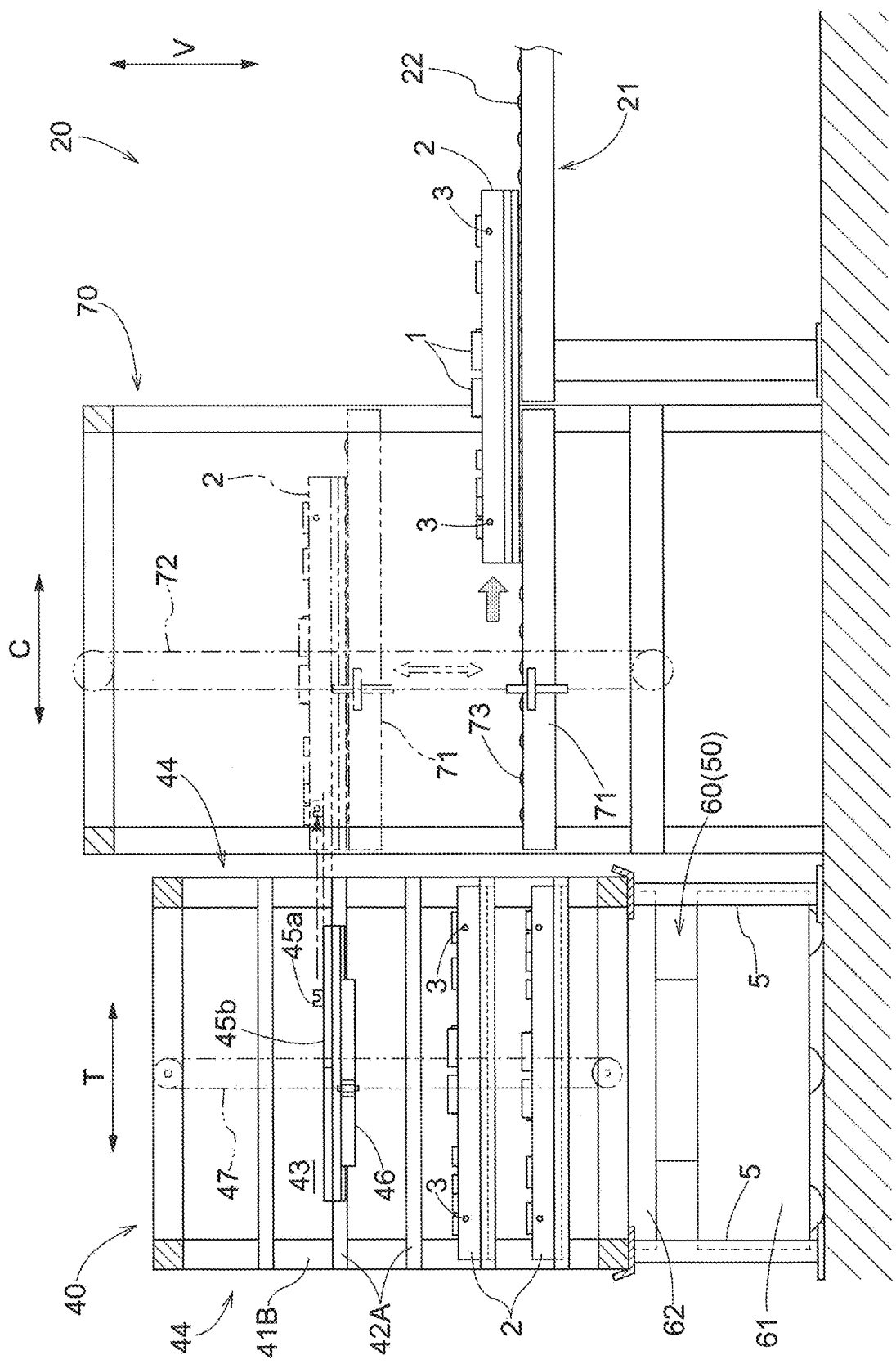
FIG. 6 is a partially cut-away side view of the container pick-up apparatus and a raising/lowering type transport apparatus according to the first embodiment.

At the position corresponding to the picking section 20, the container collection rack 40 transfers an article container 2 between the accommodation portion 43 of the container collection rack 40 and the picking section 20 using the transfer machine 45. That is to say, the transfer machine 45 transfers an article container 2 not only between the accommodation portion 43 and the accommodation compartment 33 of a container accommodation rack 30, but also between the accommodation portion 43 and the picking section 20. As shown in FIGS. 3 and 6, in the present embodiment, support bodies 5 for supporting the container collection rack 40 from below are provided at the position corresponding to the picking section 20, and the container collection rack 40 is supported by the support bodies 5 at the position corresponding to the picking section 20 and, in this state, transfers an article container 2 between the accommodation portion 43 and the picking section 20.

As shown in FIGS. 3 and 6, in the present embodiment, the picking section 20 includes a raising/lowering stage 71 that can be raised and lowered. The transfer machine 45 is configured to transfer an article container 2 between the accommodation portion 43 and the picking section 20 by moving the article container 2 between the accommodation portion 43 and the raising/lowering stage 71. Specifically, the picking section 20 includes: a work conveyor 22 provided in a worktable 21 at which the picking operation is performed; and a raising/lowering type transport apparatus 70 that transports an article container 2 between the container collection rack 40 and the work conveyor 22. The raising/lowering stage 71 is provided in the raising/lowering type transport apparatus 70. Accordingly, the position corresponding to the picking section 20 is a position corresponding to the raising/lowering type transport apparatus 70. As shown in FIGS. 3 and 6, the position corresponding to the raising/lowering type transport apparatus 70 is a position that is adjacent to the raising/lowering type transport apparatus 70 in a transport direction C, which will be described later, and the container collection rack 40 at the position corresponding to the raising/lowering type transport apparatus 70 is oriented such that the transfer direction T of the container collection rack 40 is parallel to the transport direction C.

As shown in FIG. 6, the raising/lowering type transport apparatus 70 includes: a raising/lowering mechanism 72 that raises and lowers the raising/lowering stage 71; and a transport mechanism 73 that transports an article container 2 in the transport direction C. The raising/lowering mechanism 72 is constructed using a cord-like body such as a chain, and the transport mechanism 73 is constructed using a conveyor such as a roller conveyor. In a state in which the raising/lowering stage 71 has been raised or lowered to a height corresponding to a target article container 2 to be transferred (in the example shown in FIG. 6, the position of the raising/lowering stage 71 has been raised or lowered to a height corresponding to the second tier from the top of the accommodation portion 43 as shown by the dashed and double-dotted lines), the transfer machine 45 moves the article container 2 in the transfer direction T, thereby moving the article container 2 between the accommodation portion 43 and the raising/lowering stage 71. The transport mechanism 73 is provided in the raising/lowering stage 71, and the raising/lowering type transport apparatus 70 drives the transport mechanism 73 such that the transport direction in which and the conveyance speed at which the transport mechanism 73 transports the article container 2 match the moving direction in which and the moving speed at which the transfer machine 45 moves the article container 2.

As shown in FIG. 6, in a state in which the raising/lowering stage 71 has been raised or lowered to a height corresponding to the work conveyor 22 (see the raising/lowering stage 71 shown by the solid lines in FIG. 6), the article container 2 rested on the raising/lowering stage 71 is delivered to the work conveyor 22. In a state in which the raising/lowering stage 71 has been raised or lowered to the height corresponding to the work conveyor 22 by the raising/lowering mechanism 72, the raising/lowering type transport apparatus 70 transports the article container 2 rested on the raising/lowering stage 71 toward the work conveyor 22 using the transport mechanism 73, thereby delivering the article container 2 rested on the raising/lowering stage 71 to the work conveyor 22. In the example shown in FIGS. 1 and 3, the work conveyor 22 is constructed using a roller conveyor.

The work conveyor 22 transports an article container 2 along a conveyance path that passes through a picking operation location 23 where the picking operation is performed. The work conveyor 22 is installed at such a height that allows the operator H to access an article 1 contained in the article container 2 from above, and this makes it easier for the operator H to perform the picking operation. In the example shown in FIGS. 1 and 3, at the picking operation location 23, a plurality of (here, two) article containers 2 are arranged side-by-side in a transport direction of the work conveyor 22, and thus, a plurality of (here, two) operators H can perform the picking operation at the same time.

Also, in the example shown in FIGS. 1 and 3, the work conveyor 22 is provided so as to transport an article container 2 along a circulating route (loop route) that passes through the picking operation location 23. Thus, an article container 2 after being subjected to the picking operation can be transported along the circulating route to a position corresponding to the raising/lowering type transport apparatus 70 as indicated by the arrows in FIGS. 1 and 3, and the article container 2 can be returned to the container collection rack 40 by the raising/lowering type transport apparatus 70. In this case, the article container 2 that has been transported to this position corresponding to the raising/lowering type transport apparatus 70 is delivered to the raising/lowering stage 71 in a state in which the raising/lowering stage 71 has been raised or lowered to the height corresponding to the work conveyor 22, the raising/lowering stage 71 is then raised or lowered to a height corresponding to a target tier of the accommodation portion 43 onto which the article container 2 is to be placed, and in this state, the article container 2 is moved from the raising/lowering stage 71 into the accommodation portion 43. Note that, in the present embodiment, the plurality of tiers are formed in the accommodation portion 43 at regular intervals in the vertical direction V. In this case, when loading an article container 2 into the accommodation portion 43 of the container collection rack 40, a target tier onto which the article container 2 is to be placed is selected based on the height of an article 1 contained in the article container 2, and the article container 2 is placed onto the selected target tier.

As shown in a simplified manner in FIG. 1, the article accommodation facility 100 includes the control apparatus 90. The control apparatus 90 includes a computation processing apparatus such as a CPU and includes a peripheral circuit such as a memory, and the functions of the control apparatus 90 are realized through cooperation between these pieces of hardware and a program executed on hardware such as the computation processing apparatus. The control apparatus 90 manages, for each container accommodation rack 30, information on the current position of the container accommodation rack 30 (e.g., information on the storage portion 11 in which the container accommodation rack 30 is stored or information on the pick-up position P at which the container accommodation rack 30 is placed) and information on an article container 2 accommodated in the container accommodation rack 30 (e.g., information on the types and numbers of articles 1 contained in the article container 2) in association with each other. In addition, the control apparatus 90 controls the operations of the various apparatuses included in the article accommodation facility 100 so that an article container 2 (i.e., a target article container 2 to be subjected to the picking operation) that contains an article 1 of a type specified in an order can be transported to the picking section 20 (specifically, the picking operation location 23). Each of the apparatuses included in the article accommodation facility 100 operates under the control of the control apparatus 90. Specifically, the apparatuses included in the article accommodation facility 100 are provided with respective device controllers, and each device controller controls the driving of a driving force source, such as a motor, as instructed by the control apparatus 90, thereby controlling the operation of the apparatus that is provided with the device controller.

The accommodation rack transport apparatus 50, under the control of the control apparatus 90, transports a container accommodation rack 30 stored in a storage portion 11 to a pick-up position P. For example, a container accommodation rack 30 that accommodates an article container 2 that is highly likely to be subjected to the picking operation (e.g., an article container 2 in which seasonal products during the peak season are contained as articles 1) is transported from a storage portion 11 to a pick-up position P by the accommodation rack transport apparatus 50 (in the present embodiment, the stacker crane 51 and a rack transport vehicle 60). Also, the accommodation rack transport apparatus 50, under the control of the control apparatus 90, transports a container accommodation rack 30 placed at a pick-up position P to a storage portion 11. For example, a container accommodation rack 30 that accommodates an article container 2 that is unlikely to be subjected to the picking operation (e.g., an article container 2 in which seasonal products after the peak season are contained as articles 1) is transported from a pick-up position P to a storage portion 11 by the accommodation rack transport apparatus 50 (in the present embodiment, the stacker crane 51 and a rack transport vehicle 60). Also, for example, a container accommodation rack 30 that accommodates an article container 2 to be subjected to an operation for replacing articles 1, a container accommodation rack 30 that accommodates an article container 2 to be subjected to an operation for replenishing articles 1, or a container accommodation rack 30 that accommodates an article container 2 to be subjected to an operation for checking (operation for taking an inventory of) articles 1 is transported from a pick-up position P to a storage portion 11 by the accommodation rack transport apparatus 50.

The rack transport vehicle 60, under the control of the control apparatus 90, transports a container collection rack 40 to the position corresponding to a pick-up position P at which a target container accommodation rack 30 from which an article container 2 is to be taken out is placed, and then transports the container collection rack 40 to the position corresponding to the picking section 20. Note that the target container accommodation rack 30 from which an article container 2 is to be taken out is a container accommodation rack 30 that accommodates a target article container 2 to be subjected to the picking operation. The container collection rack 40 at the position corresponding to the pick-up position P, under the control of the control apparatus 90, takes out a target article container 2 that is to be subjected to the picking operation from the container accommodation rack 30, and loads the article container 2 into the accommodation portion 43. For example, the container collection rack 40 in a state in which all of the tiers formed in its accommodation portion 43 accommodate target article containers 2 to be subjected to the picking operation is transported to the position corresponding to the picking section 20. Note that, in the case where target article containers 2 to be subjected to the picking operation are separately accommodated in a plurality of container accommodation racks 30, the rack transport vehicle 60 successively transports the container collection rack 40 to positions corresponding to a plurality of pick-up positions P at which the plurality of container accommodation racks 30 are placed, and, at each of these positions, the container collection rack 40 takes out the target article container 2 to be subjected to picking from the container accommodation rack 30, and loads the article container 2 into the accommodation portion 43.

At the position corresponding to the picking section 20, the container collection rack 40, under the control of the control apparatus 90, delivers an article container 2 accommodated in the accommodation portion 43 to the raising/lowering stage 71. Then, the raising/lowering type transport apparatus 70, under the control of the control apparatus 90, delivers the article container 2 rested on the raising/lowering stage 71 to the work conveyor 22. In this manner, the article containers 2 accommodated in the accommodation portion 43 of the container collection rack 40 are delivered one by one to the work conveyor 22 via the raising/lowering stage 71. Although details are not given here, an article container 2 after being subjected to the picking operation is delivered from the work conveyor 22 to the raising/lowering stage 71, and then loaded into the accommodation portion 43 of a container collection rack 40 placed at the position corresponding to the picking section 20. Then, the container collection rack 40 that accommodates the article container 2 after being subjected to the picking operation is transported to a position corresponding to a pick-up position P by a rack transport vehicle 60, and the container collection rack 40, at the position corresponding to the pick-up position P, loads the article container 2 accommodated in the accommodation portion 43 into the accommodation compartment 33 of a container accommodation rack 30 located at the pick-up position P.

Second Embodiment

Figure 7:
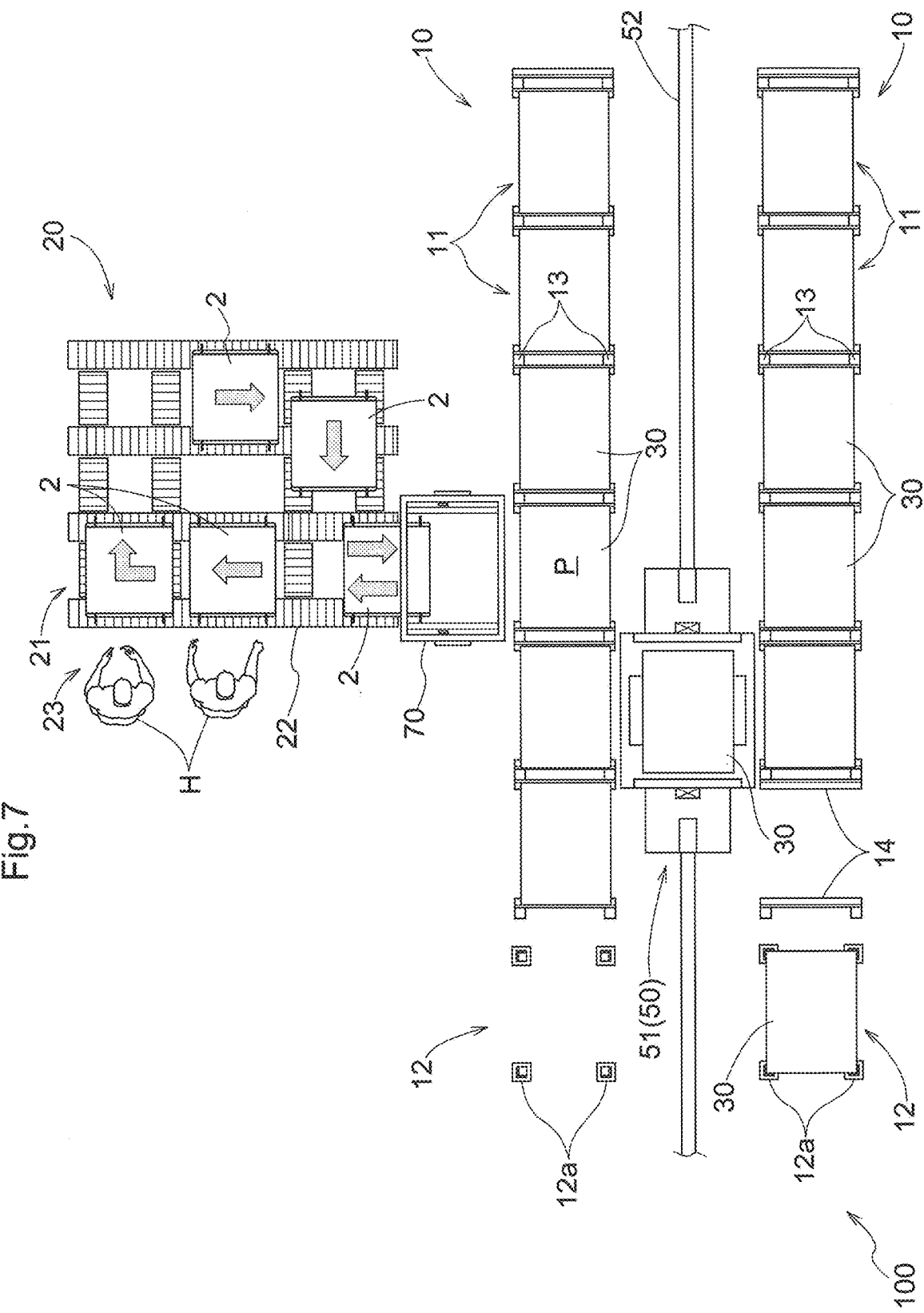
FIG. 7 is a schematic plan view of an article accommodation facility according to a second embodiment.
Figure 8:
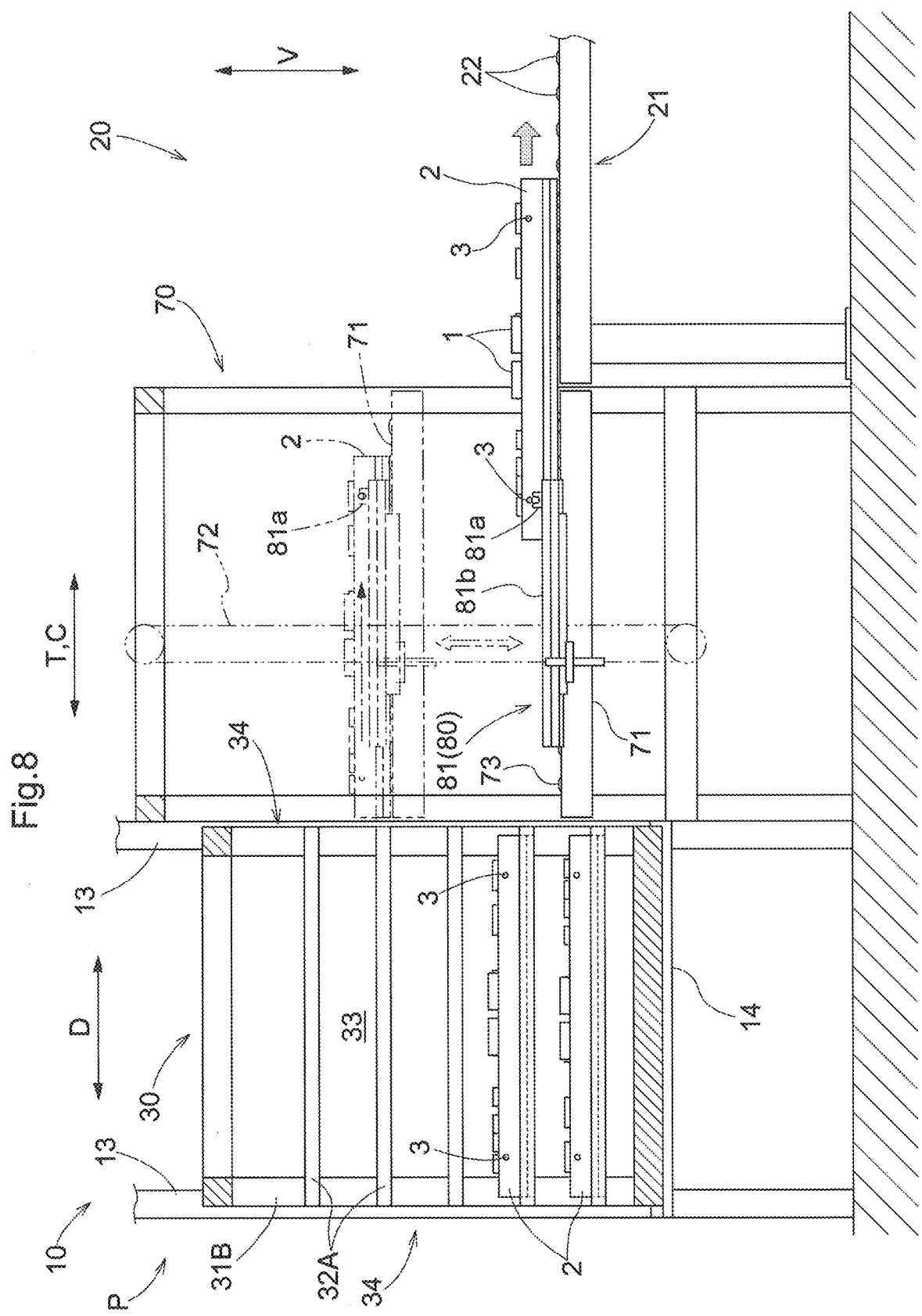
FIG. 8 is a partially cut-away side view of a container accommodation member and a raising/lowering type transport apparatus according to the second embodiment.

A second embodiment of the article accommodation facility will be described with reference to the drawings (FIGS. 7 and 8). In the following description, an article accommodation facility of the present embodiment will be described focusing on differences from the first embodiment. Components that are not otherwise specified are similar to those of the first embodiment and are denoted by the same reference numerals, and detailed descriptions thereof are omitted.

As shown in FIG. 7, in the present embodiment, a pick-up position P is provided in a storage rack 10, instead of outside the storage racks 10, and replaces a certain storage portion 11. Specifically, a certain storage portion 11 of a plurality of storage portions 11 arranged at the bottom of the storage rack 10 is used as a pick-up position P for taking out an article container 2 from a container accommodation rack 30, instead of a position for storing a container accommodation rack 30. In addition, the accommodation rack transport apparatus 50 (specifically, the stacker crane 51) transports a container accommodation rack 30 between the pick-up position P and a storage portion 11.

In the present embodiment, the article accommodation facility 100 includes a container transfer apparatus 80 as the container pick-up apparatus that takes out an article container 2 from a container accommodation rack 30 through its opening 34 at the pick-up position P. That is to say, the container transfer apparatus 80 at the pick-up position P takes out an article container 2 from a container accommodation rack 30 through its opening 34. Furthermore, in the present embodiment, the article accommodation facility 100 includes the raising/lowering type transport apparatus 70 as the container transport apparatus that transports an article container 2 taken out from a container accommodation rack 30 by the container pick-up apparatus to the picking section 20. That is to say, the raising/lowering type transport apparatus 70 transports an article container 2 taken out from a container accommodation rack 30 by the container transfer apparatus 80 to the picking section 20. The container transfer apparatus 80 is provided in the raising/lowering type transport apparatus 70. In the present embodiment, the container transfer apparatus 80 corresponds to the "container pick-up apparatus" and the raising/lowering type transport apparatus 70 corresponds to the "container transport apparatus".

As shown in FIG. 8, in the present embodiment, the raising/lowering stage 71 included in the raising/lowering type transport apparatus 70 is arranged at a position corresponding to the pick-up position P. That is to say, the raising/lowering type transport apparatus 70 includes the raising/lowering stage 71 that is installed at a position corresponding to the pick-up position P and that can be raised and lowered. The raising/lowering stage 71 is provided at a position that is adjacent to the pick-up position P and is located on the opposite side (i.e., rear face side of the storage rack 10) of the pick-up position P from the side of a traveling path of the stacker crane 51. At the pick-up position P, each container accommodation rack 30 is oriented such that the putting-in/taking-out direction D of the container accommodation rack 30 is parallel to the rack front-rear direction of the storage rack 10.

In the example shown in FIG. 8, the raising/lowering stage 71 is provided with: a transfer machine 81 included in the container transfer apparatus 80; and the transport mechanism 73 that transports an article container 2 in the transport direction C (here, rack front-rear direction of the storage rack 10). That is to say, the container transfer apparatus 80 includes a "transfer machine" that is provided in the raising/lowering type transport apparatus 70 (specifically, the raising/lowering stage 71) and that transfers an article container 2 between any one of the levels of the accommodation compartment 33 and the raising/lowering stage 71. In the example shown in FIG. 8, the transfer machine 81 and the transport mechanism 73 correspond to the "transfer machine". When transferring an article container 2, the transport mechanism 73 is driven such that the transport direction in which and the conveyance speed at which the transport mechanism 73 transports the article container 2 match the moving direction in which and the moving speed at which the transfer machine 81 moves the article container 2.

The transfer machine 81 moves an article container 2 in the transfer direction T (here, direction extending along the rack front-rear direction of the storage rack 10) that extends along a horizontal plane, thereby moving the article container 2 between the accommodation compartment 33 of the container accommodation rack 30 located at the pick-up position P and the raising/lowering stage 71 through the opening 34. The transfer direction T is parallel to the transport direction C. When taking out an article container 2 from a container accommodation rack 30 using the transfer machine 81, the transfer machine 81 moves the target article container 2 to be transferred, in the transfer direction T in a state in which the raising/lowering stage 71 has been raised or lowered to a height corresponding to the article container 2 (in the example shown in FIG. 8, the position of the raising/lowering stage 71 has been raised or lowered to a height corresponding to the second tier from the top of the accommodation compartment 33 as shown by the dashed and double-dotted lines), thereby moving the article container 2 from the accommodation compartment 33 to the raising/lowering stage 71. On the other hand, when returning an article container 2 into a container accommodation rack 30 using the transfer machine 81, the transfer machine 81 moves the article container 2 in the transfer direction T in a state in which the raising/lowering stage 71 has been raised or lowered to a height corresponding to a target tier onto which the article container 2 is to be placed, of the accommodation compartment 33, thereby moving the article container 2 from the raising/lowering stage 71 to the accommodation compartment 33.

In the example shown in FIG. 8, the transfer machine 81 includes: an engaging portion 81a that is engageable with the engaged portion 3 provided on each article container 2; and an advancing/retracting mechanism 81b that advances and retracts the engaging portion 81a in the transfer direction T. Switching between a state in which the engaging portion 81a is in engagement with the engaged portion 3 and a state in which the engaging portion 81a is out of engagement with the engaged portion 3 can be achieved by, for example, moving the engaging portion 81a up or down or rotating the engaging portion 81a. The transfer machine 81 moves an article container 2 in the transfer direction T by the advancing/retracting mechanism 81b advancing and retracting the engaging portion 81a in a state in which the engaging portion 81a is in engagement with the engaged portion 3, and thereby pushing or pulling the article container 2. In the example shown in FIG. 8, the transfer machine 81 is provided on the raising/lowering stage 71, and is raised and lowered together with the raising/lowering stage 71 by the raising/lowering mechanism 72.

As shown in FIG. 8, in the present embodiment, the picking section 20 is installed at a position corresponding to the container transfer apparatus 80. The container transfer apparatus 80 transfers an article container 2 between the raising/lowering type transport apparatus 70 (specifically, the raising/lowering stage 71) and the picking section 20 using the transfer machine 81 and the transport mechanism 73. That is to say, the transfer machine 81 and the transport mechanism 73 transfer an article container 2 not only between the accommodation compartment 33 of a container accommodation rack 30 and the raising/lowering stage 71 but also between the raising/lowering stage 71 and the picking section 20. Specifically, the transfer machine 81 and the transport mechanism 73 are configured to transfer an article container 2 between the raising/lowering stage 71 and the picking section 20 by moving the article container 2 between the raising/lowering stage 71 and the work conveyor 22. The transfer machine 81 and the transport mechanism 73 move the article container 2 between the raising/lowering stage 71 and the work conveyor 22 in a state in which the raising/lowering stage 71 has been raised or lowered to a height corresponding to the work conveyor 22 (see the raising/lowering stage 71 shown by the solid lines in FIG. 8).

As described above, in the example shown in FIG. 8, the transfer machine 81 and the transport mechanism 73 correspond to the "transfer machine". However, it is also possible that, when transferring an article container 2, only a portion of this transfer machine (specifically, only the transfer machine 81, or only the transport mechanism 73) is operated. For example, a configuration may be adopted in which the transfer of an article container 2 between the raising/lowering stage 71 and the picking section 20 is performed by operating only the transport mechanism 73, of the transfer machine 81 and the transport mechanism 73. Furthermore, a configuration may also be adopted in which the raising/lowering stage 71 is not provided with the transport mechanism 73.

In the present embodiment, the accommodation rack transport apparatus 50 (specifically, the stacker crane 51), under the control of the control apparatus 90, transports a container accommodation rack 30 that accommodates a target article container 2 to be subjected to the picking operation from a storage portion 11 to the pick-up position P. Then, the raising/lowering type transport apparatus 70 in which the container transfer apparatus 80 is provided, under the control of the control apparatus 90, takes out the target article container 2 to be subjected to the picking operation from the container accommodation rack 30 placed at the pick-up position P, rests the article container 2 on the raising/lowering stage 71, and delivers the article container 2 rested on the raising/lowering stage 71 to the work conveyor 22. In this manner, article containers 2 contained in the accommodation compartments 33 of container accommodation racks 30 are delivered one by one to the work conveyor 22 via the raising/lowering stage 71. Although details are not given here, an article container 2 after being subjected to the picking operation is delivered from the work conveyor 22 to the raising/lowering stage 71, and then loaded into the accommodation compartment 33 of a container accommodation rack 30 placed at the pick-up position P. Then, the container accommodation rack 30 accommodating the article container 2 after being subjected to the picking operation is transported to a storage portion 11 by the accommodation rack transport apparatus 50 (specifically, the stacker crane 51).

OTHER EMBODIMENTS

Next, other embodiments of the article accommodation facility will be described.

(1) In the above-described second embodiment, a configuration was described as an example in which the pick-up position P is provided in a storage rack 10, replacing a certain storage portion 11. However, the present disclosure is not limited to such a configuration. The configuration of the second embodiment may be modified such that, as in an example shown in FIG. 9, for example, the pick-up position P is provided outside a storage rack 10. In the example shown in FIG. 9, a carry-out portion 15 and a carry-in portion 16 are provided in a storage rack 10, replacing certain storage portions 11, and a buffer conveyor 24 that transports a container accommodation rack 30 from the carry-out portion 15 to the carry-in portion 16 via the pick-up position P is provided. In this example, the accommodation rack transport apparatus 50 (specifically, the stacker crane 51) transports a container accommodation rack 30 that accommodates a target article container 2 to be subjected to the picking operation from a storage portion 11 to the carry-out portion 15, and also transports a container accommodation rack 30 that accommodates an article container 2 after being subjected to the picking operation from the carry-in portion 16 to a storage portion 11. In this example, a container accommodation rack 30 to be transported to the pick-up position P can be allowed to stay on the buffer conveyor 24, and therefore, the time from when a container accommodation rack 30 is carried out from the pick-up position P to when the next container accommodation rack 30 is carried into the pick-up position P can be reduced to a short length of time, and transport efficiency can thus be improved. In the example shown in FIG. 9, the stacker crane 51 and the buffer conveyor 24 correspond to the "accommodation member transport apparatus" that transports a container accommodation rack 30 between a storage portion 11 and the pick-up position P.

(2) In the above-described first embodiment, a configuration was described as an example in which the transfer machine 45 moves an article container 2 in the transfer direction T by advancing and retracting the engaging portion 45a engaged with the engaged portion 3 of the article container 2. Also, in the above-described second embodiment, a configuration was described as an example in which the transfer machine 81 moves an article container 2 in the transfer direction T by advancing and retracting the engaging portion 81a engaged with the engaged portion 3 of the article container 2. However, the present disclosure is not limited to such a configuration. For example, a configuration may also be adopted in which the transfer machine 45 or the transfer machine 81 moves an article container 2 in the transfer direction T by advancing and retracting support bodies that hold the article container 2 therebetween, a support body that supports the article container 2 from below, or a support body that supports the article container 2 by suction.

(3) In the above-described first embodiment, a configuration was described as an example in which the outside transport apparatus and the container transport apparatus can share the same transport device, and the rack transport vehicle 60, which is the shared transport device, can be used both as the outside transport apparatus and as the container transport apparatus. However, the present disclosure is not limited to such a configuration. A configuration may also be adopted in which a transport device used as the outside transport apparatus and a transport device used as the container transport apparatus are provided separately.

(4) In the above-described embodiments, a configuration was described as an example in which the accommodation rack transport apparatus 50 includes the stacker crane 51 as a transport apparatus that transports a container accommodation rack 30 in a storage rack 10. However, the present disclosure is not limited to such a configuration. A configuration may also be adopted in which the accommodation rack transport apparatus 50 includes a transport apparatus other than the stacker crane 51, as the transport apparatus that transports a container accommodation rack 30 in a storage rack 10. Transport apparatuses that are provided for respective levels of a storage rack 10 and that transport container accommodation racks 30 in the rack width direction are conceivable as an example of the transport apparatus other than the stacker crane 51.

(5) Note that as long as there are no discrepancies, the configuration disclosed in the above-described embodiment can also be applied in combination with configurations disclosed in the other embodiments (includes combinations of embodiments described as the other embodiments). Regarding the other configurations as well, the embodiments disclosed in the present specification are merely simple illustrations in all respects. Accordingly, various modifications and alterations can be made as appropriate without departing from the gist of the present disclosure.

SUMMARY OF ABOVE-DESCRIBED EMBODIMENTS

Hereinafter, a summary of the article accommodation facility described above will be described.

An article accommodation facility includes an article container that contains one or more types of articles; a container accommodation member that has an accommodation compartment capable of accommodating the article container on a plurality of levels in a vertical direction and that has an opening for putting the article container into, and taking out the article container from, the accommodation compartment, the opening being formed in a side face of the accommodation compartment; an accommodation member transport apparatus that transports the container accommodation member between a storage portion in which the container accommodation member is stored and a pick-up position; a container pick-up apparatus that takes out the article container from the container accommodation member through the opening at the pick-up position; and a container transport apparatus that transports the article container taken out from the container accommodation member by the container pick-up apparatus to a picking section where the article container is subjected to a picking operation.

According to this configuration, the container accommodation member capable of accommodating an article container on a plurality of levels in the vertical direction can be stored in the storage portion while accommodating a plurality of article containers. Accordingly, a vertical space can be effectively used, and storage efficiency for article containers can thus be improved. In addition, according to this configuration, the accommodation member transport apparatus that transports the container accommodation member transports the container accommodation member between the storage portion and the pick-up position, rather than between the storage portion and the picking section, and the container transport apparatus transports the article container taken out from the container accommodation member by the container pick-up apparatus at the pick-up position to the picking section. Thus, even in the case where the container accommodation member that accommodates a target article container that is to be subjected to the picking operation also accommodates a non-target article container that is not to be subjected to the picking operation, only the target article container that is to be subjected to the picking operation can be transported to the picking section.

As described above, according to this configuration, it is possible to avoid transporting an article container to the picking section that does not need to be transported, while improving the storage efficiency for article containers. Note that this configuration makes it possible to store a container accommodation member in a storage portion provided at a different position from the pick-up position where the container pick-up apparatus takes out an article container from a container accommodation member. Therefore, container accommodation members can be placed appropriately in the storage portion or at the pick-up position such that a container accommodation member accommodating an article container that is unlikely to be subjected to the picking operation (e.g., an article container that contains seasonal products after the peak season) is stored in the storage portion, while a container accommodation member accommodating an article container that is highly likely to be subjected to the picking operation (e.g., an article container that contains seasonal products during the peak season) is placed at the pick-up position. Accordingly, this configuration also has the advantage of being able to improve transport efficiency of the transport of a target article container that is to be subjected to the picking operation to the picking section. Furthermore, since a container accommodation member can be stored in a storage portion provided at a different position from the pick-up position in this manner, storage portions can be provided without the necessity of giving much consideration to the ease of taking out an article container from a container accommodation member. Accordingly, this configuration also has the advantage of making it easy to provide storage portions so as to improve the storage efficiency for article containers by arranging storage portions at relatively high positions, for example.

Here, it is preferable that the article accommodation facility further includes a storage rack in which a plurality of said storage portions are formed, wherein the container pick-up apparatus includes an accommodation portion capable of accommodating the article container on a plurality of levels in the vertical direction and a transfer machine that transfers the article container between any one of the levels in the accommodation compartment and the accommodation portion, the container transport apparatus transports the container pick-up apparatus from a position corresponding to the pick-up position to a position corresponding to the picking section, and the transfer machine also transfers the article container between the accommodation portion and the picking section.

According to this configuration, since the article accommodation facility includes the storage rack in which a plurality of storage portions are formed, a plurality of storage portions can be easily arranged adjacent to each other, and storage efficiency for article containers can thus be improved. Also, according to this configuration, the container pick-up apparatus includes the accommodation portion capable of accommodating an article container on a plurality of levels in the vertical direction, and the container transport apparatus transports the container pick-up apparatus from a position (hereinafter referred to as "first position") corresponding to the pick-up position to a position (hereinafter referred to as "second position") corresponding to the picking section. Therefore, the container pick-up apparatus that have taken out a plurality of target article containers that are to be subjected to the picking operation from a container accommodation member and that accommodates the plurality of target article containers in the accommodation portion can be transported from the first position to the second position by the container transport apparatus, and thereby the plurality of target article containers that are to be subjected to the picking operation can be transported to the second position together with the container pick-up apparatus in which those target article containers are accommodated. Thus, even in the case where there is an especially long distance between the first position and the second position, transport efficiency of the transport of a target article container that is to be subjected to picking to the picking section can be improved. Note that, according to this configuration, with the use of the transfer machine included in the container pick-up apparatus, an article container can be directly transferred between the container pick-up apparatus and a container accommodation member, and also an article container can be directly transferred between the container pick-up apparatus and the picking section. In this respect as well, transport efficiency for article containers can be improved.

Furthermore, it is preferable that the container pick-up apparatus includes a communication portion via which an inside and an outside of the accommodation portion are in communication with each other, and the transfer machine is configured to move the article container between the inside and the outside of the accommodation portion through the communication portion.

According to this configuration, a container pick-up apparatus that can put an article container into, and take out the article container from, the accommodation portion using the transfer machine can be favorably realized.

Furthermore, it is preferable that the accommodation member transport apparatus includes an outside transport apparatus that transports the container accommodation member outside the storage rack, between the storage rack and the pick-up position, and the outside transport apparatus and the container transport apparatus can share the same transport device.

According to this configuration, since the shared transport device can be used both as the outside transport apparatus and as the container transport apparatus, a cost reduction can be achieved. Specifically, for example, the number of transport apparatuses that are needed for the entire facility can be reduced.

Furthermore, it is preferable that the picking section includes a raising/lowering stage that can be raised and lowered, and the transfer machine is configured to transfer the article container between the accommodation portion and the picking section by moving the article container between the accommodation portion and the raising/lowering stage.

According to this configuration, in a state in which the raising/lowering stage has been raised or lowered to a height corresponding to a target article container that is to be transferred, the article container can be transferred between the accommodation portion of the container pick-up apparatus and the picking section using the transfer machine. Accordingly, while this transfer is being performed, the article container can be maintained in a horizontal position, and the article container containing an article can be appropriately transferred between the accommodation portion of the container pick-up apparatus and the picking section.

Furthermore, it is preferable that the article accommodation facility further includes a storage rack in which a plurality of said storage portions are formed, wherein the container transport apparatus includes a raising/lowering stage that is installed at a position corresponding to the pick-up position and that can be raised and lowered, the container pick-up apparatus is provided in the container transport apparatus and includes a transfer machine that transfers the article container between any one of the levels in the accommodation compartment and the raising/lowering stage, the picking section is installed at a position corresponding to the container pick-up apparatus, and the transfer machine also transfers the article container between the raising/lowering stage and the picking section.

According to this configuration, since the article accommodation facility includes the storage rack in which a plurality of storage portions are formed, a plurality of storage portions can be easily arranged adjacent to each other, and storage efficiency for article containers can thus be improved. In addition, according to this configuration, in a state in which the raising/lowering stage of the container transport apparatus has been raised or lowered to a height corresponding to a target article container that is to be transferred, the article container can be transferred between the accommodation compartment of a container accommodation member and the raising/lowering stage of the container transport apparatus using the transfer machine included in the container pick-up apparatus. Accordingly, while this transfer is being performed, the article container can be maintained in a horizontal position, and the article container containing an article can be appropriately taken out from the accommodation compartment of the container accommodation member onto the raising/lowering stage of the container transport apparatus. Then, according to this configuration, the article container that has been taken out onto the raising/lowering stage included in the container transport apparatus can be directly transferred to the picking section using the transfer machine included in the container pick-up apparatus. Accordingly, transport efficiency can be improved, compared with a case in which an article container that has been taken out onto the raising/lowering stage of the container transport apparatus is transferred to the picking section via another transport apparatus.

Furthermore, it is preferable that the picking section includes a work conveyor provided in a worktable at which the picking operation is performed, and the article container rested on the raising/lowering stage is delivered to the work conveyor in a state in which the raising/lowering stage has been raised or lowered to a height corresponding to the work conveyor.

According to this configuration, by raising/lowering the raising/lowering stage to a height corresponding to the work conveyor, it is possible to maintain an article container in a horizontal position while the article container is being transferred between the raising/lowering stage and the work conveyor. Accordingly, the work conveyor can be installed at a height suitable for the picking operation, and an article container containing an article can be appropriately delivered from the raising/lowering stage to the work conveyor.

Furthermore, it is preferable that, when a direction that is orthogonal to a direction in which the article container is put into and taken out from the accommodation compartment and that extends along a horizontal direction is referred to as a width direction, one side in the width direction is referred to as a first side, and another side in the width direction is referred to as a second side, the container accommodation member includes: a first vertical frame that is provided on the first side with respect to the accommodation compartment and extends in the vertical direction; a second vertical frame that is provided on the second side with respect to the accommodation compartment and extends in the vertical direction; a first support portion that protrudes from the first vertical frame toward the second side, at a location corresponding to each level in the accommodation compartment; and a second support portion that protrudes from the second vertical frame toward the first side, at a location corresponding to each level in the accommodation compartment, and the article container in the accommodation compartment is supported by the first support portion and the second support portion from the two sides in the width direction.

According to this configuration, a container accommodation member that has an accommodation compartment capable of accommodating an article container on a plurality of levels in the vertical direction and that has an opening for putting an article container into, and taking out an article container from, the accommodation compartment, the opening being formed in a side face of the accommodation compartment, can be appropriately realized.

The article accommodation facility according to the present disclosure need only be able to exhibit at least one of the above-described effects.

What is claimed is:
1. An article accommodation facility comprising:
   an article container that contains one or more types of articles;
   a container accommodation member comprising an accommodation compartment capable of accommodating the article container on a plurality of levels in a vertical direction, the accommodation compartment having an opening for putting the article container into and taking out the article container from the accommodation compartment, the opening being formed in a side face of the accommodation compartment;
   an accommodation member transport apparatus that transports the container accommodation member between a storage portion in which the container accommodation member is stored and a pick-up position;
   a container pick-up apparatus that takes out the article container from the container accommodation member through the opening at the pick-up position; and
   a container transport apparatus,
   wherein the container transport apparatus transports the article container taken out from the container accommodation member by the container pick-up apparatus to a picking section where the article container is subjected to a picking operation, and
   wherein the container transport apparatus transports the container pick-up apparatus from a position corresponding to the pick-up position to a position corresponding to the picking section.

2. The article accommodation facility according to claim 1, further comprising:
   a storage rack in which a plurality of said storage portions are formed,
   wherein the container pick-up apparatus comprises an accommodation portion capable of accommodating the article container on a plurality of levels in the vertical direction and a transfer machine that transfers the article container between any one of the levels in the accommodation compartment and the accommodation portion,
   and
   wherein the transfer machine also transfers the article container between the accommodation portion and the picking section.

3. The article accommodation facility according to claim 2,
   wherein the container pick-up apparatus comprises a communication portion via which an inside and an outside of the accommodation portion are in communication with each other, and wherein the transfer machine is configured to move the article container between the inside and the outside of the accommodation portion through the communication portion.

4. The article accommodation facility according to claim 2,
wherein the accommodation member transport apparatus comprises an outside transport apparatus that transports the container accommodation member outside the storage rack, between the storage rack and the pick-up position, and
wherein the outside transport apparatus and the container transport apparatus can share the same transport device.

5. The article accommodation facility according to claim 2,
wherein the picking section comprises a raising/lowering stage that can be raised and lowered, and
wherein the transfer machine is configured to transfer the article container between the accommodation portion and the picking section by moving the article container between the accommodation portion and the raising/lowering stage.

6. The article accommodation facility according to claim 5,
wherein the picking section comprises a work conveyor provided in a worktable at which the picking operation is performed, and
wherein the article container rested on the raising/lowering stage is delivered to the work conveyor in a state in which the raising/lowering stage has been raised or lowered to a height corresponding to the work conveyor.

7. The article accommodation facility according to claim 1,
wherein, when a direction that is orthogonal to a direction in which the article container is put into and taken out from the accommodation compartment and that extends along a horizontal direction is referred to as a width direction, one side in the width direction is referred to as a first side, and another side in the width direction is referred to as a second side,
the container accommodation member comprising:
a first vertical frame that is provided on the first side with respect to the accommodation compartment and extends in the vertical direction;
a second vertical frame that is provided on the second side with respect to the accommodation compartment and extends in the vertical direction;
a first support portion that protrudes from the first vertical frame toward the second side, at a location corresponding to each level in the accommodation compartment; and
a second support portion that protrudes from the second vertical frame toward the first side, at a location corresponding to each level in the accommodation compartment, and
wherein the article container in the accommodation compartment is supported by the first support portion and the second support portion from the two sides in the width direction.

8. An article accommodation facility comprising:
an article container that contains one or more types of articles;
a container accommodation member comprising an accommodation compartment capable of accommodating the article container on a plurality of levels in a vertical direction, the accommodation compartment having an opening for putting the article container into and taking out the article container from the accommodation compartment, the opening being formed in a side face of the accommodation compartment;
an accommodation member transport apparatus that transports the container accommodation member between a storage portion in which the container accommodation member is stored and a pick-up position;
a container pick-up apparatus that takes out the article container from the container accommodation member through the opening at the pick-up position;
a container transport apparatus that transports the article container taken out from the container accommodation member by the container pick-up apparatus to a picking section where the article container is subjected to a picking operation; and
a storage rack in which a plurality of said storage portions are formed,
wherein the container transport apparatus comprises a raising/lowering stage that is installed at a position corresponding to the pick-up position and that can be raised and lowered,
wherein the container pick-up apparatus is provided in the container transport apparatus and comprises a transfer machine that transfers the article container between any one of the levels in the accommodation compartment and the raising/lowering stage,
wherein the picking section is installed at a position corresponding to the container pick-up apparatus, and
wherein the transfer machine also transfers the article container between the raising/lowering stage and the picking section.

* * * * *